(12) United States Patent
Hao et al.

(10) Patent No.: US 8,497,664 B2
(45) Date of Patent: Jul. 30, 2013

(54) HIGH EFFICIENCY MULTI-PHASE GENERATOR

(75) Inventors: Lei Hao, Troy, MI (US); Chandra S. Namuduri, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 895 days.

(21) Appl. No.: 12/622,198

(22) Filed: Nov. 19, 2009

(65) Prior Publication Data

US 2011/0116291 A1 May 19, 2011

(51) Int. Cl.
*H02P 11/00* (2006.01)
*H02P 9/00* (2006.01)

(52) U.S. Cl.
USPC .............................................. 322/24; 322/99

(58) Field of Classification Search
USPC .......................... 322/99, 24, 36; 363/126, 127
See application file for complete search history.

(56) References Cited

U.S. PATENT DOCUMENTS

| | | | | |
|---|---|---|---|---|
| 3,829,652 A | * | 8/1974 | Terry | 219/133 |
| 5,387,859 A | * | 2/1995 | Murugan et al. | 322/10 |
| 5,414,339 A | * | 5/1995 | Masaki et al. | 318/800 |
| 5,650,707 A | * | 7/1997 | Lipo et al. | 318/773 |
| 6,707,169 B2 | * | 3/2004 | Shimizu et al. | 290/40 C |
| 7,135,784 B2 | | 11/2006 | Murty et al. | |
| 2001/0026460 A1 | * | 10/2001 | Ito et al. | 363/34 |
| 2003/0085715 A1 | * | 5/2003 | Lubkeman et al. | 324/509 |
| 2005/0046397 A1 | * | 3/2005 | Peter | 322/44 |
| 2006/0017290 A1 | * | 1/2006 | Murty et al. | 290/36 R |
| 2006/0043940 A1 | * | 3/2006 | Wang | 322/24 |
| 2007/0200346 A1 | * | 8/2007 | Kanazawa et al. | 290/40 B |
| 2008/0103632 A1 | * | 5/2008 | Saban et al. | 700/286 |
| 2008/0211552 A1 | * | 9/2008 | Lu | 327/143 |
| 2008/0284385 A1 | | 11/2008 | Namuduri et al. | |
| 2010/0027305 A1 | * | 2/2010 | Oyobe et al. | 363/131 |
| 2011/0006710 A1 | * | 1/2011 | Kondo et al. | 318/400.03 |

\* cited by examiner

*Primary Examiner* — Julio Gonzalez
(74) *Attorney, Agent, or Firm* — John A. Miller; Miller IP Group, PLC

(57) ABSTRACT

A generator system that includes a six-phase AC machine and an active rectifier bridge employing low on-resistance switches, such as MOSFET switches, for converting the AC current from the machine to a DC current. The system also includes a switch control circuit to switch the MOSFET switches in synchronization with the six-phase current flow. The system determines the phase-to-ground voltages of the machine for inputs to the switch control circuit. The control circuit calculates the phase-to-phase voltages from the phase-to-ground voltages. The control circuit uses a specific control scheme to determine if each of the phase-to-phase voltages is above or below first and second predetermined threshold voltages, where if the phase-to-phase voltage is above the first threshold voltage, the control circuit closes the switch, and if the phase-to-phase voltage is below the second threshold voltage, the control circuit opens the switch.

18 Claims, 4 Drawing Sheets

HIGH EFFICIENCY MULTI-PHASE GENERATOR

BACKGROUND OF THE INVENTION

1. Field of the Invention

This invention relates generally to a generator system and, more particularly, to a six-phase generator system for a vehicle that includes an active rectifier bridge employing low-on resistance metal oxide semiconductor field effect transistor (MOSFET) switches and a control scheme for controlling the switches.

2. Discussion of the Related Art

Vehicles employ generators that are driven by a belt coupled to the vehicle engine to generate electrical power. Automotive electrical generators typically employ an AC synchronous machine with three-phase or six-phase stator windings, a DC excitation winding on a claw-pole rotor, a voltage regulator and a diode bridge rectifier to produce a DC output. The excitation current of the synchronous machine is controlled by the voltage regulator to regulate the DC output voltage of the generator. Permanent magnets have been employed in the claw-pole device to increase the power output and efficiency of the generator for a given generator.

High efficiency generators usually employ shaped conductor stator windings to reduce copper losses, thinner stator laminations to reduce iron losses, low friction bearings, a laminated rotor construction and permanent magnetic excitation, all of which add significant cost and/or mass to the generator.

As mentioned above, known generator assemblies typically employ a diode bridge to convert the AC to a DC where the diodes conduct depending on the propagation direction of the current through the three-phase coils or the six-phase coils. A three-phase machine generally requires six diodes and a six-phase machine generally requires twelve diodes. The three-phase or six-phase diode bridge generally contributes about 20% - 50% of the total losses of the generator. Particularly, the amount of power used to conduct the diodes may provide a power loss at 100 amps of about 180 watts and a total diode voltage loss of about 1.8 volts.

SUMMARY OF THE INVENTION

In accordance with the teachings of the present invention, a generator system is disclosed that includes a six-phase AC machine and an active rectifier bridge employing low on-resistance switches, such as MOSFET switches, for converting the AC current from the machine to a DC current. The system also includes a switch control circuit to switch the MOSFET switches in synchronization with the six-phase current flow. The system determines the phase-to-ground voltages of the machine for inputs to the switch control circuit. The control circuit calculates the phase-to-phase voltages from the phase-to-ground voltages. The control circuit uses a specific control scheme to determine if each of the phase-to-phase voltages is above or below first and second predetermined threshold voltages, where if the phase-to-phase voltage is above the first threshold voltage, the control circuit closes the switch, and if the phase-to-phase voltage is below the second threshold voltage, the control circuit opens the switch. The system also disables the switches if the speed of the machine is below a predetermined threshold speed.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a generator system employing a six-phase machine and an active rectifier bridge including MOSFET switches is merely exemplary in nature, and is in no way intended to limit the invention or its applications or uses.

Figure 1:
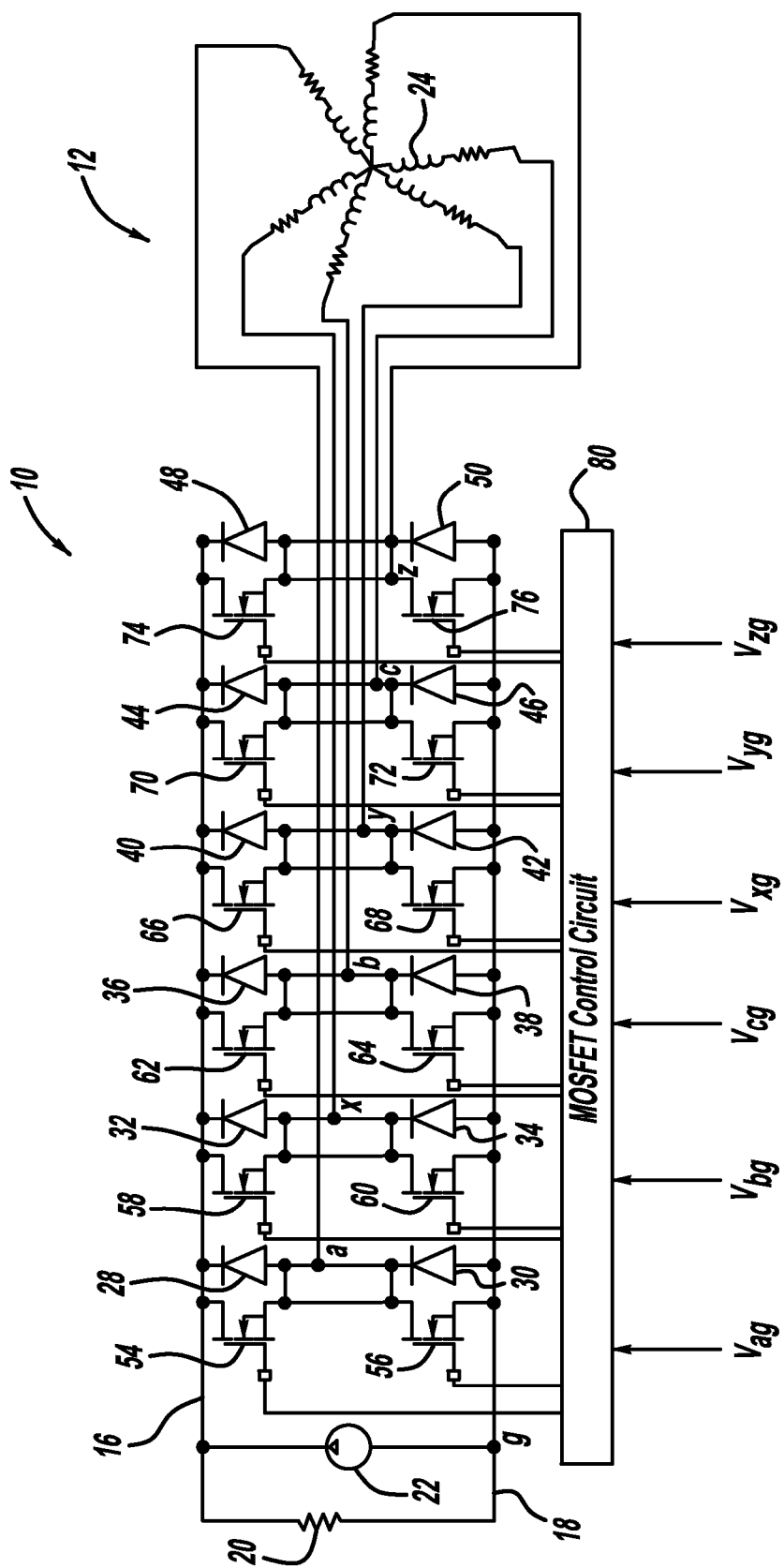
FIG. 1 is a schematic diagram of a generator system including an active rectifier bridge employing MOSFET switches, according to an embodiment of the present invention.

FIG. 1 is a schematic diagram of a generator system 10, according to an embodiment of the present invention. The system 10 includes a six-phase claw-pole machine 12 having a field coil in a rotor (not shown) of the machine 12 and six AC synchronous armature coils 24 in a stator of the machine 12. In this non-limiting embodiment, the machine 12 is a Lundell machine. Permanent magnets can be incorporated in the rotor of the machine 12 between the claw-poles to provide additional flux to that produced by the field coil, where the total flux is responsible to produce voltage in the armature coils 24. The system 10 includes a positive rail 16 and a negative rail 18. The DC voltage is used to drive electric loads 20 in the vehicle, and to charge a vehicle battery 22.

The system 10 includes a rectifier circuit 26 having a plurality of MOSFET switches 54, 56, 58, 60, 62, 64, 66, 68, 70, 72, 74 and 76 that pass and block current flow to rectify the AC current from the armature coils 24 to a DC current to provide power to the loads 20 and charge the vehicle battery 22. The rectifier circuit 26 also includes a plurality of diodes 28, 30, 32, 34, 36, 38, 40, 42, 44, 46, 48 and 50 that are coupled across the MOSFET switches 54, 56, 58, 60, 62, 64, 66, 68, 70, 72, 74 and 76, respectively, and provide a current path when the MOSFET is turned off and machine line-to-line voltage is still higher than DC voltage. A switch control circuit 80 controls whether the switches 54, 56, 58, 60, 62, 64, 66, 68, 70, 72, 74 and 76 are opened or closed in association with whether the corresponding machine line-to-line voltage is still higher than DC voltage. The diodes 28, 30, 32, 34, 36, 38, 40, 42, 44, 46, 48 and 50 can be integral body-drain diodes within the respective MOSFET switch 54, 56, 58, 60, 62, 64, 66, 68, 70, 72, 74 and 76. Additionally, the diodes 28, 30, 32, 34, 36, 38, 40, 42, 44, 46, 48 and 50 can be zener diodes with a voltage clamping capability when subjected to reverse overvoltage in excess of a reverse breakdown voltage.

The phase-to-ground voltages $V_{ag}$, $V_{bg}$, $V_{cg}$, $V_{xg}$, $V_{yg}$ and $V_{zg}$ between the stator terminals, identified by nodes a, b, c, x, y and z in the circuit 26, and battery ground or the negative rail 18, are input to the control circuit 80 to determine the control signal that opens/closes the MOSFET switch 54, 56, 58, 60, 62, 64, 66, 68, 70, 72, 74 or 76. The phase at the nodes a, b and c are 120° electrical apart and the phase at the nodes x, y and z are 120° electrical apart, thus providing a combination of two three-phase coil configurations. The phase shift between the two three-phase coil sets can be arbitrary, although a phase shift of 30° electrical may be preferred to minimize NVH. Thus, instead of the known machine where the six coils are defined as being 60° apart in electrical phase, the combination of the two sets of three-phase coils can be 30° electrical apart in phase.

Voltage divider circuits (not shown) can be employed to divide the phase voltages between nodes a, b, c, x, y and z and the ground rail 18 to a level suitable for the control circuit 80. This information allows the control circuit 80 to know which of the switches 54, 56, 58, 60, 62, 64, 66, 68, 70, 72, 74 and 76 to close/open to provide the current rectification. Output lines from the control circuit 80 are applied to the gate terminal of the MOSFET switches 54, 56, 58, 60, 62, 64, 66, 68, 70, 72, 74 and 76 to provide the signal that closes/opens the switch.

The turn-on and turn-off points of each MOSFET switch 54, 56, 58, 60, 62, 64, 66, 68, 70, 72, 74 and 76 are controlled by comparing the phase-to-phase voltages with a predetermined upper and lower threshold level during positive and negative half-cycles of the output waveform from the machine 12. The control circuit 80 for the MOSFET switches 54, 56, 58, 60, 62, 64, 66, 68, 70, 72, 74 and 76 also detects the generator speed (RPM) using the frequency of one or more of the phase-to-ground voltages $V_{ag}$, $V_{bg}$, $V_{cg}$, $V_{xg}$, $V_{yg}$ and $V_{zg}$ For generator speeds below a predetermined threshold, the switching of the MOSFET switches 54, 56, 58, 60, 62, 64, 66, 68, 70, 72, 74 and 76 is disabled to prevent undesirable discharge of the battery 22 through the generator windings and the diode 28, 30, 32, 34, 36, 38, 40, 42, 44, 46, 48 or 50 may conduct current to rectify the generator output.

Figure 2A:
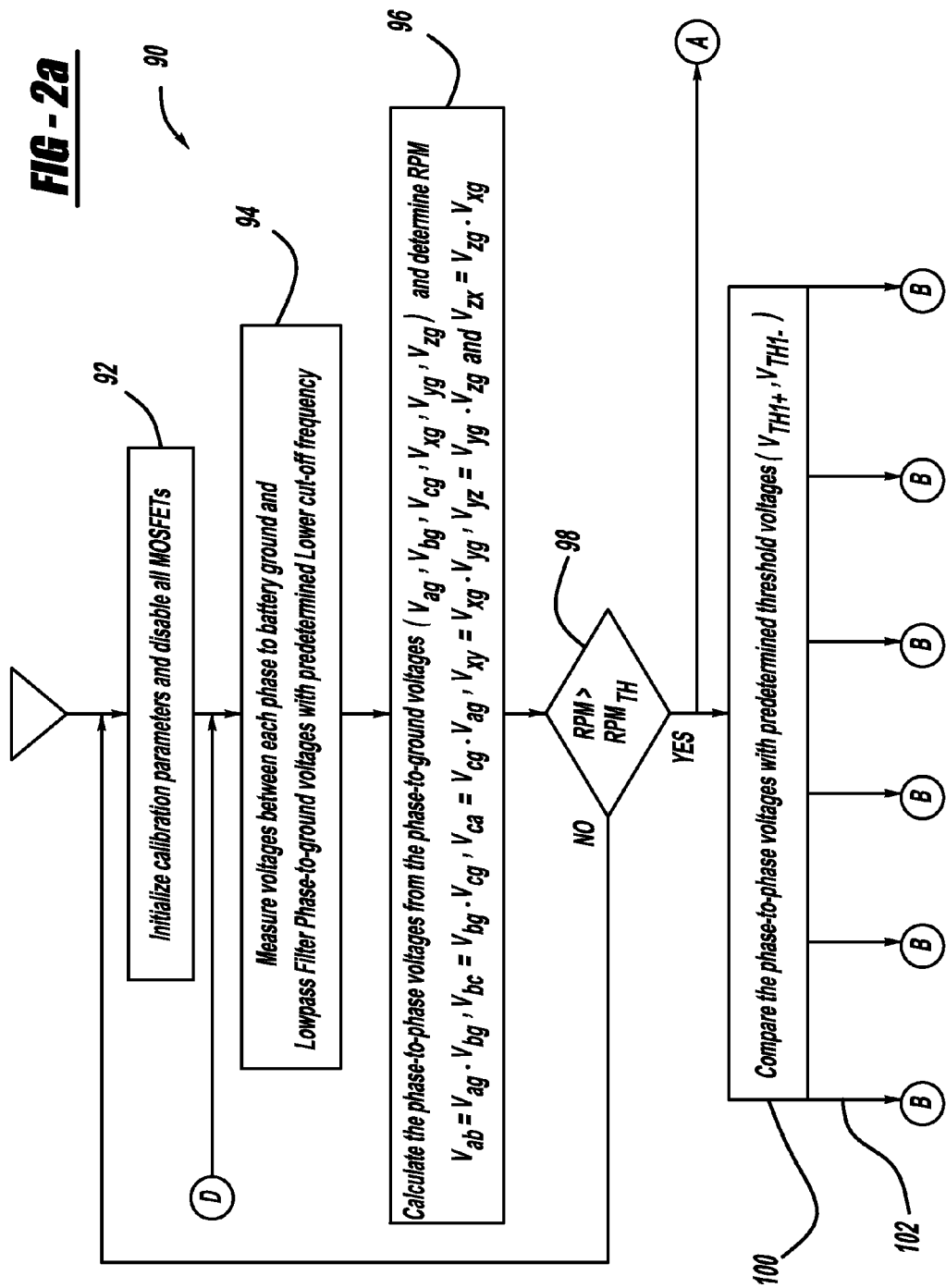
FIGS. 2(a)-2(c) are a flow chart diagram showing a process for selectively turning on and off the MOSFET switches in the generator system of FIG. 1, according to an embodiment of the present invention.
Figure 2B:
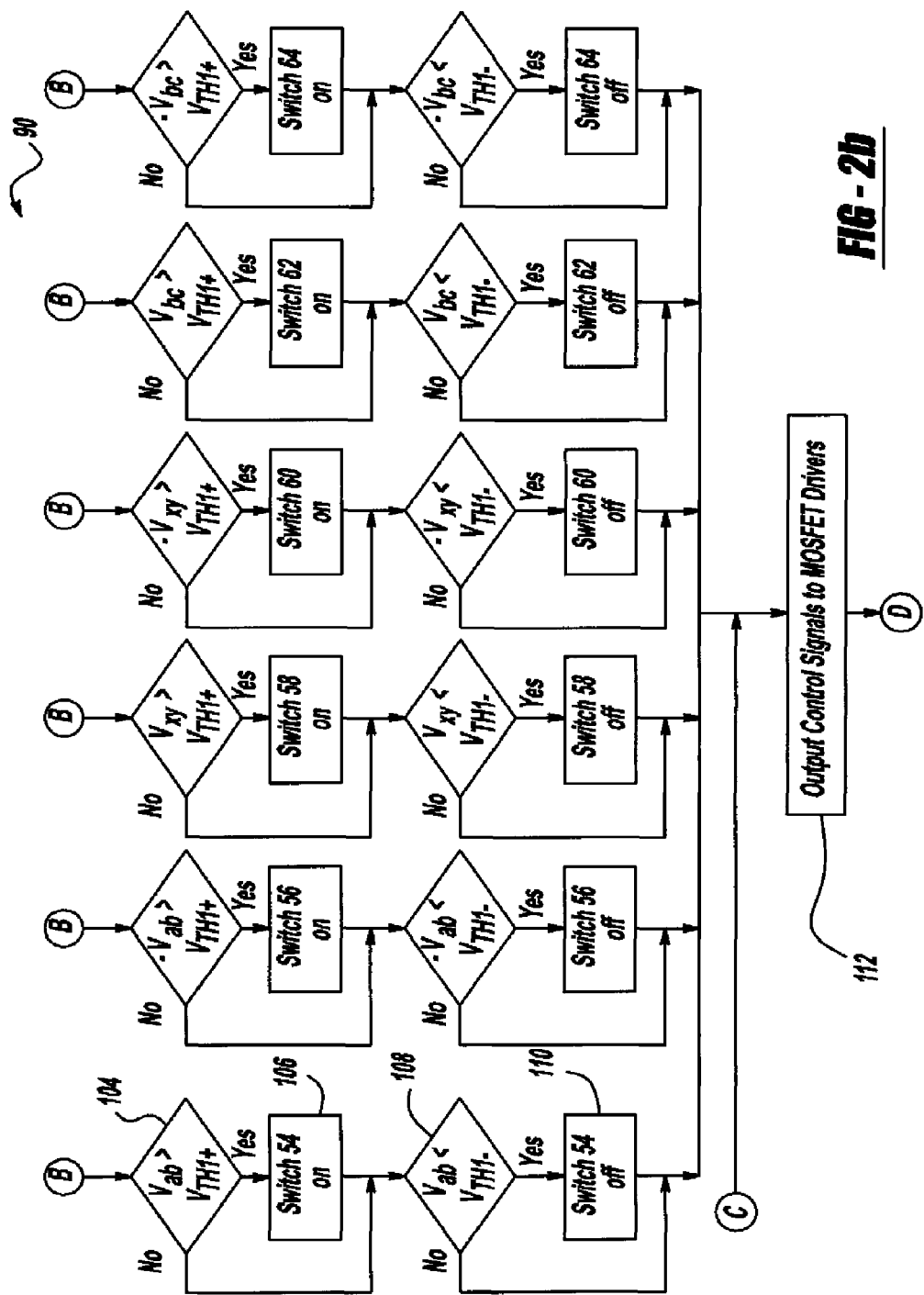
Figure 2C:
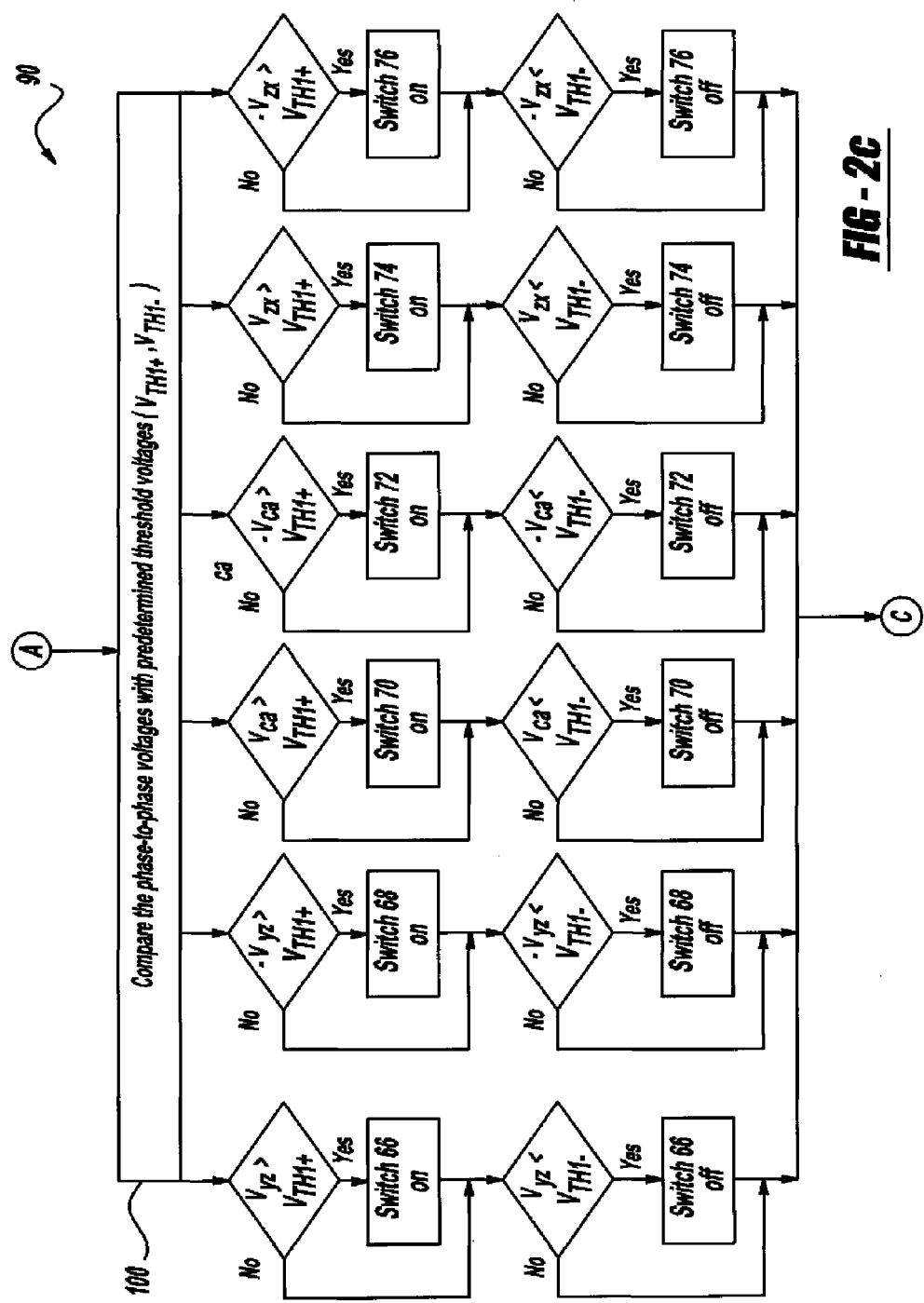

FIGS. 2(a)-(c) are a flow chart diagram 90 showing an operation for switching the MOSFET switches 54, 56, 58, 60, 62, 64, 66, 68, 70, 72, 74 and 76 to provide the phase rectifying control, according to an embodiment of the present invention. The algorithm initializes the calibration parameters and disables (opens) the MOSFET switches 54, 56, 58, 60, 62, 64, 66, 68, 70, 72, 74 and 76 at box 92. The calibration parameters can include the voltage thresholds and the minimum RPM, both discussed below, used by the control circuit 80, and other system parameters necessary for the operation of the generator system 10.

The algorithm then measures the voltages between each phase and battery ground to get the phase-to-ground voltages $V_{ag}$, $V_{bg}$, $V_{cg}$, $V_{xg}$, $V_{yg}$ and $V_{zg}$ for the inputs to the control circuit 80 at box 94. The phase-to-ground voltages $V_{ag}$, $V_{bg}$, $V_{cg}$, $V_{xg}$, $V_{yg}$ and $V_{zg}$ may need to be attenuated or scaled to a level suitable for the digital circuitry in the control circuit 80. Also, the process can provide low-pass filtering of the phase-to-ground voltages using a predetermined low cut-off frequency at the box 94 to suppress undesirable high frequency noise. The algorithm then calculates the phase-to-phase voltages $V_{ab}$, $V_{ba}$, $V_{bc}$, $V_{cb}$, $V_{ca}$, $V_{ac}$, $V_{xy}$, $V_{yx}$, $V_{yz}$, $V_{zy}$, $V_{zx}$ and $V_{xz}$ between the nodes a, b, c, x, y and z from the phase-to-ground voltages $V_{ag}$, $V_{bg}$, $V_{cg}$, $V_{xg}$, $V_{yg}$ and $V_{zg}$ as $V_a-V_b$, $V_b-V_a$, $V_b-V_c$, $V_c-V_b$, $V_c-V_a$, $V_a-V_c$, $V_x-V_y$, $V_y-V_x$, $V_y-V_z$, $V_z-V_y$, $V_z-V_x$ and $V_x-V_z$, respectively, at box 66. It is also possible to calculate $V_{ba}$, $V_{cb}$, $V_{ac}$, $V_{yx}$, $V_{zy}$ and $V_{yz}$ directly from $V_{ab}$, $V_{bc}$, $V_{ca}$, $V_{xy}$, $V_{yz}$ and $V_{zx}$ as $V_{ba}=-V_{ab}$, $V_{cb}=-V_{bc}$, $V_{ac}=-V_{ca}$, $V_{yx}=-V_{xy}$, $V_{zy}=-V_{yz}$ and $V_{xz}=-V_{zx}$.

The algorithm also determines the speed of the machine 12 at the box 96 using, for example, the frequency of one or more of the phase-to-ground voltages $V_{ag}$, $V_{bg}$, $V_{cg}$, $V_{xg}$, $V_{yg}$ and $V_{zg}$. The algorithm then determines whether the RPM of the machine 12 is greater than a predetermined threshold $RPM_{TH}$ at decision diamond 98, and if not, returns to the box 92 for initializing the calibration parameters. The algorithm prevents switching on of the MOSFET switches 54, 56, 58, 60, 62, 64, 66, 68, 70, 72, 74 and 76 if the speed of the machine 12 is below a predetermined RPM to prevent undesirable discharge of the battery 22 through the machine windings.

If the speed of the machine 12 is greater than the threshold $RPM_{TH}$ at the decision diamond 98, then the algorithm compares the phase-to-phase voltages for each of the MOSFET switches 54, 56, 58, 60, 62, 64, 66, 68, 70, 72, 74 and 76 with predetermined threshold voltages $V_{TH1+}$ and $V_{TH1-}$ at box 100. If a particular phase-to-phase voltage is above the predetermined threshold $V_{TH1+}$, then the control circuit 80 will close the respective switch 54, 56, 58, 60, 62, 64, 66, 68, 70, 72, 74 or 76 associated with that phase-to-phase voltage. If a particular phase-to-phase voltage is below the other predetermined threshold voltage $V_{TH1-}$, then the control circuit 80 will cause the respective switch 54, 56, 58, 60, 62, 64, 66, 68, 70, 72, 74 or 76 to be opened. Once the particular MOSFET switch 54, 56, 58, 60, 62, 64, 66, 68, 70, 72, 74 and 76 is opened or closed it will stay in that position until the threshold is exceeded to change its state. The threshold voltages $V_{TH1+}$ and $V_{TH1-}$ are selected so that the particular MOSFET switch 54, 56, 58, 60, 62, 64, 66, 68, 70, 72, 74 or 76 will be opened or closed depending on whether its associated diode is conducting to provide the rectification process. The threshold voltages $V_{TH1+}$ and $V_{TH1-}$ do not need to be negatives of each other in that any suitable upper threshold voltage and lower threshold voltage can be used for a particular system.

Each comparison of the phase-to-phase voltages for each of the MOSFET switches 54, 56, 58, 60, 62, 64, 66, 68, 70, 72, 74 and 76 is shown on a separate channel 102. The algorithm determines whether the phase-to-phase voltage for the particular MOSFET switch 54, 56, 58, 60, 62, 64, 66, 68, 70, 72, 74 or 76 is greater than the predetermined threshold voltage $V_{TH1+}$ at decision diamond 104. If the phase-to-phase voltage is greater than the threshold voltage $V_{TH1+}$ at the decision diamond 104, then the algorithm closes that particular MOSFET switch 54, 56, 58, 60, 62, 64, 66, 68, 70, 72, 74 or 76, otherwise, maintains the MOSFET switch 54, 56, 58, 60, 62, 64, 66, 68, 70, 72, 74 or 76 in its previous state. The algorithm then determines whether the phase-to-phase voltage is less than the threshold voltage $V_{TH1-}$ at decision diamond 108, and if so, opens the particular MOSFET switch 54, 56, 58, 60, 62, 64, 66, 68, 70, 72, 74 or 76 at box 110. Otherwise, the MOSFET switch 54, 56, 58, 60, 62, 64, 66, 68, 70, 72, 74 or 76 remains in its previous state. All of the output signals are then sent to the MOSFET drivers to switch the switches 54, 56, 58, 60, 62, 64, 66, 68, 70, 72, 74 and 76 at box 112 and the process returns to the box 94.

The logic provided by the flow diagram 90 provides the proper switching of the switches 54, 56, 58, 60, 62, 64, 66, 68, 70, 72, 74 and 76 because of the phase orientation of the coils 24 represented by the nodes a, b, c, x, y and z. Particularly, because the coils 24 on the stator in the machine 12 are oriented and electrically defined to be two three-phase coil combinations, where the coils in each separate coil sets are 120° apart and the two coil combinations are 30° apart electrical. Each three-phase set of coils can be connected as star or delta connection. If the six coils where a single symmetrical combination of coils where adjacent coils were 60° apart electrical, then the logic provided by FIG. 2 would not cause the switches 54, 56, 58, 60, 62, 64, 66, 68, 70, 72, 74 and 76 to switch on and off properly for the rectification.

It is envisioned that the voltage regulation function and the MOSFET control function could be independently provided by separate electronic control circuits or both functions could be integrated into a single electronic control circuit. The electronic control circuit may be implemented using a combination of discrete and/or integrated circuits, a microcontroller, a digital signal processor or an application specific integrated circuit (ASIC).

By using the MOSFET switches and the control method discussed above, the generator system 10 has a number of advantages over those generator systems that employed diode only rectifier bridges. Particularly, the generator system 10 has a significant reduction in generator rectification losses, a significant reduction in operating temperature of the heat sink, a potential reduction in fan loss and noise due to reduced heat load, an improvement in overall efficiency of the generator system 10, and an improvement in vehicle fuel economy. In addition, the control method described requires no additional sensors, such as phase current sensors, DC bus current sensors or rotor position sensors, which add significant cost and/or reduce the efficiency gain due to power loss in the sensors.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A generator system comprising:
   an AC machine including six armature coils;
   a rectifier circuit electrically coupled to the armature coils, said rectifier circuit including twelve switches where a node between an adjacent pair of the switches defines a phase voltage node for a particular one of the armature coils, wherein the six armature coils are defined as a combination of two three-phase sets of coils where the two sets of coils are oriented relative to each other by a predetermined electrical phase; and
   a control circuit providing control signals to the rectifier circuit to switch the switches on and off, said control circuit determining whether phase-to-phase voltages of the machine between each of the nodes are above a first predetermined threshold voltage or below a second predetermined threshold voltage for each of the twelve switches, wherein the control circuit turns on a switch associated with a particular phase of the machine if the phase-to-phase voltage for that phase is greater than the first predetermined threshold voltage and turns off the switch if the phase-to-phase voltage for that phase is less than the second predetermined threshold voltage, and wherein the control circuit determines whether the speed of the machine is below a predetermined speed threshold, and prevents the switches from being turned on if the speed of the machine is below the speed threshold.

2. The system according to claim 1 wherein the two sets of armature coils are oriented 30° apart in electrical phase.

3. The system according to claim 1 wherein the control circuit determines the phase-to-ground voltages of the armature coils, and calculates the phase-to-phase voltages from the phase-to-ground voltages.

4. The system according to claim 1 wherein the switches are MOSFET switches.

5. The system according to claim 1 wherein the rectifier includes a diode electrically coupled across each switch.

6. The system according to claim 5 wherein the diodes are zener diodes with a voltage clamping capability.

7. The system according to claim 1 wherein the generator system is on a vehicle.

8. The system according to claim 1 wherein each three-phase set of coils can be connected as a star connection.

9. A generator system for a vehicle, said system comprising:
   a six-phase machine including six armature coils;
   a rectifier circuit electrically coupled to the armature coils, said rectifier circuit including twelve MOSFET switches where a node between an adjacent pair of the switches defines a phase voltage node for a particular one of the armature coils, wherein the six armature coils are defined as a combination of two three-phase sets of coils where the two sets of coils are oriented relative to each other 30° apart in electrical phase, wherein each three-phase set of coils can be connected as star or delta connection; and
   a control circuit providing control signals to the rectifier circuit to switch the switches on and off, said control circuit determine the phase-to-ground voltage of the armature coils at six locations in the rectifier circuit and calculating twelve phase-to-phase voltages from the phase-to-phase ground voltages, said control circuit determining whether the phase-to-phase voltages of the machine are above a first predetermined threshold voltage or below a second predetermined threshold voltage for each of the twelve switches, wherein the control circuit turns on a switch associated with a particular phase of the machine if the phase-to-phase voltage for that phase is greater than the first predetermined threshold voltage and turns off the switch if the phase-to-phase voltage for that phase is less than the second predetermined threshold voltage.

10. The system according to claim 9 wherein the control circuit determines whether the speed of the machine is below a predetermined speed threshold, and prevents the switches from being turned on if the speed of the machine is below the speed threshold.

11. The system according to claim 9 wherein the rectifier includes a diode electrically coupled across each switch.

12. The system according to claim 11 wherein the diodes are zener diodes with a voltage clamping capability.

13. The system according to claim 11 where the diodes are integral body-drain diodes within the respected MOSFET switch.

14. A method for rectifying an AC signal from an AC machine, said AC machine including six armature coils, said method comprising:
   defining the six armature coils in the machine as a combination of two three-phase sets of coils where the two set of coils are oriented relative to each other by a predetermined electrical phase;
   determining the voltage between each phase of the machine and a predetermined ground;
   calculating phase-to-phase voltages from the phase-to-phase ground voltages;
   comparing the phase-to-phase voltages to a first predetermined threshold voltage and a second predetermined threshold voltage;
   turning on a switch associated with a particular phase of the machine if the phase-to-phase voltage for that phase is greater than the first predetermined threshold voltage;
   turning off the switch if the phase-to-phase voltage for that phase is less than a second predetermined threshold voltage; and
   determining the speed of the machine, and preventing the switches from being closed if the speed of the machine is less than a predetermined speed.

15. The method according to claim 14 wherein determining the voltage between each phase of machine and a predetermined ground includes determining six phase-to-phase ground voltages, and calculating the phase-to-phase voltages includes calculating twelve phase-to-phase voltages.

16. The method according to claim 14 wherein the switches are MOSFET switches.

17. The method according to claim 14 further comprising providing a diode electrically coupled across each switch.

18. The method according to claim 14 wherein the two sets of coils are 30° apart in electrical phase.

* * * * *